(12) United States Patent
Moseley et al.

(10) Patent No.: US 7,599,612 B2
(45) Date of Patent: Oct. 6, 2009

(54) METHOD OF CALIBRATING A MOTORIZED ROLLER SHADE

(75) Inventors: Robin C. Moseley, Macungie, PA (US);
Wendy Margaret Moseley, legal representative, Macungie, PA (US);
David A. Kirby, Emmaus, PA (US);
Justin Mierta, Allentown, PA (US);
Thomas W. Brenner, Wescosville, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 453 days.

(21) Appl. No.: 11/439,468

(22) Filed: May 23, 2006

(65) Prior Publication Data

US 2007/0272374 A1    Nov. 29, 2007

(51) Int. Cl.
*H02P 7/00* (2006.01)
*H02P 3/00* (2006.01)
*A47G 5/02* (2006.01)
(52) U.S. Cl. .................. 388/811; 318/466; 318/468; 318/469; 318/453; 318/470; 160/310
(58) Field of Classification Search ............... 318/430, 318/465, 466, 684, 685, 266, 468, 469, 453, 318/470; 160/310, 268; 388/811
See application file for complete search history.

(56) References Cited

U.S. PATENT DOCUMENTS

| | | | |
|---|---|---|---|
| 5,556,492 A | 9/1996 | Vonderhorst et al. | |
| 5,848,634 A | 12/1998 | Will et al. | |
| 5,850,131 A * | 12/1998 | Wolfer et al. | 318/466 |
| 6,082,433 A | 7/2000 | Vafaie et al. | |
| 6,100,659 A | 8/2000 | Will et al. | |
| 6,201,364 B1 | 3/2001 | Will et al. | |
| 6,497,267 B1 | 12/2002 | Azar et al. | |
| 6,640,494 B2 | 11/2003 | Hormann | |
| 6,859,004 B2 | 2/2005 | Hormann | |
| 6,983,783 B2 | 1/2006 | Carmen, Jr. et al. | |
| 7,005,824 B2 * | 2/2006 | Akiwa | 318/684 |
| 7,281,565 B2 * | 10/2007 | Carmen et al. | 160/310 |
| 2005/0173080 A1 * | 8/2005 | Carmen et al. | 160/310 |

(Continued)

FOREIGN PATENT DOCUMENTS

DE    299 21 261    3/2000

(Continued)

Primary Examiner—Paul Ip
(74) Attorney, Agent, or Firm—Ostrolenk Faber LLP

(57) ABSTRACT

Calibration of a motorized roller shade is accomplished by calculating a radius of a roller tube and thickness of a shade fabric rotatably supported by the roller tube. First, a lower edge of the shade fabric is moved to a first position at a first linear distance from a predetermined position. Second, a first number of revolutions of the roller tube between the first position and the predetermined position is determined. Next, the lower edge of the shade fabric is moved to a second position at a second linear distance from the predetermined position and a second number of revolutions between the second position and the predetermined position is determined. Finally, the tube radius and the fabric thickness are calculated from the first and second linear distances and the first and second numbers of revolutions. The tube radius and the fabric thickness are used to control the linear speed of the lower edge of the shade fabric.

27 Claims, 7 Drawing Sheets

U.S. PATENT DOCUMENTS

| | | | |
|---|---|---|---|
| 2007/0272374 A1* | 11/2007 | Moseley et al. | 160/310 |
| 2007/0295459 A1* | 12/2007 | Carmen et al. | 160/310 |
| 2007/0295460 A1* | 12/2007 | Carmen et al. | 160/310 |
| 2008/0094762 A1* | 4/2008 | Ochiai | 361/24 |

FOREIGN PATENT DOCUMENTS

| | | |
|---|---|---|
| DE | 100 03 630 | 8/2001 |
| EP | 1 120 528 | 8/2001 |
| FR | 2 812 110 | 1/2002 |
| WO | WO 2005/078229 | 8/2005 |

* cited by examiner

METHOD OF CALIBRATING A MOTORIZED ROLLER SHADE

BACKGROUND OF THE INVENTION

1. Field of the Invention

The present invention relates to a method of controlling motorized window shades, and more specifically, a method of calibrating a motorized roller shade in order to determine a radius of the roller tube and a thickness of the shade fabric.

2. Description of the Related Art

Motorized roller shades include a flexible shade fabric wound onto an elongated roller tube. The roller tube is rotatably supported so that a lower end of the shade fabric can be raised and lowered by rotating the roller tube. The roller tubes are generally in the shape of a right circular cylinder having various lengths for supporting shade fabrics of various width. Motorized roller shades include a drive system engaging the roller tube to provide for tube rotation. The shade fabric is typically moved between an open position and a closed position.

For aesthetic reasons, it is desirable that the outer diameter of the roller tube be as small as possible. Roller tubes, however, are generally supported only at their ends and are otherwise unsupported throughout their length. Roller tubes, therefore, are susceptible to sagging if the cross-section of the roller tube does not provide for sufficient bending stiffness for a selected material. Therefore, an increase in the length of a roller tube is generally accompanied by an increase in the outer diameter of the tube.

In certain situations, such as for shading areas of very large width or for shading areas that are non-planar across their width, it may be desirable to use multiple roller shades. In these situations, it may also be necessary or desirable to use roller tubes having different lengths. Relatively long tubes might require that a larger diameter be used compared to shorter tubes in order to limit sagging. Where multiple roller shades are used to shade a given area, the capability of raising or lowering the shades such that their lower ends move consonantly as a unit (i.e., simultaneously at the same speed) is desirable. However, two roller shades having tubes of differing diameter will not raise or lower a shade fabric at the same speed if they are rotated at the same rotational speed.

For any member that is rotated about a central axis, the linear speed at a surface of the rotating member will depend on the distance between the surface and the rotational axis. Thus, for a given rotational speed (i.e., rpm), the resulting linear speed (i.e., in/sec) at the outer surface of the tube will vary in direct proportion to outer tube diameter. Therefore, two roller tubes having differing outer diameters that are driven at the same rotational speed will have different linear speeds at the outer surface. The larger diameter tube will have a higher linear speed at the outer surface and, accordingly, will windingly receive, or release, the associated shade fabric at a faster rate than the smaller diameter tube.

The ability to provide constant shade speed for two roller shades having tubes of differing diameters is further complicated because the shade speed for either one of the roller shades will not remain constant as the shade is raised or lowered between two shade positions. The winding receipt of a shade fabric onto a roller tube creates layers of overlapping material that increase the distance between the rotational axis and the point at which the shade fabric is windingly received compared to the distance at the tube outer surface. As a result, the shade speed will vary depending on the thickness of the overlapping layers of material received on the roller tube.

A prior art motorized window treatment control system provides a method for controlling shade fabric speed for multiple motorized roller shades to achieve a constant linear speed of the hembar (i.e., the lower edge of the shade fabric). The desired linear shade speed, roller tube diameter, shade fabric thickness, and shade fabric length are stored in a memory for use by a microprocessor of the motorized window treatment controller. Preferably, the roller tube rotational speed is varied by the microprocessor depending on shade position determined by signals from Hall effect sensors. The microprocessor maintains a counter number that is increased or decreased depending on direction of rotation. Based on the counter number, the microprocessor determines shade position and a corrected rotational speed for the desired linear shade speed. Preferably, the microprocessor controls roller tube rotational speed using a pulse width modulated signal. The system may be used to control first and second roller shades having roller tubes of differing diameters or shade fabrics of varying thicknesses. The method for controlling the linear speed of a roller shade fabric is called Intelligent Hembar Alignment (IHA) and is described in greater detail in commonly-assigned U.S. patent application Ser. No. 10/774,919, filed Feb. 9, 2004, entitled CONTROL SYSTEM FOR UNIFORM MOVEMENT OF MULTIPLE ROLLER SHADES, the entire disclosure of which is incorporated herein by reference.

The inputs of the method of controlling the linear speed of a roller shade fabric, i.e., roller tube diameter, shade fabric thickness, and shade fabric length, are often not known at the time of installation and configuration of the control system. It is preferable to program these values of the roller tube diameter, shade fabric thickness, and shade fabric length in the memory of the microprocessor of the motorized window treatment controller before being shipped. However, this requires that a production worker measure the roller tube diameter and the shade fabric thickness with a measuring tool, such as a pair of calipers, at the time of manufacturing. Accordingly, this increases the time required for the manufacturing process and increases the cost of the motorized rollers shades.

Further, there are some installation factors that usually cannot be determined at the time of manufacturing, but still affect the values of the roller tube diameter, the shade fabric thickness, and shade fabric length. For example, the initial wrap (i.e., the amount of shade fabric that is wrapped around the roller tube when the shade fabric is in the closed position) is not typically known at the time of manufacturing. Variation of the amount of initial wrap results from variation in the mounting height of the roller shade at the time of installation.

What is needed, therefore, is a method of calibrating a roller shade in order to quickly determine the radius of the roller tube and the thickness of the fabric such that the linear speed of the roller shade can be easily controlled.

SUMMARY OF THE INVENTION

According to the present invention, a method of determining a radius of a roller tube, and a thickness of a material wound around the roller tube, of at least one motorized circular cylinder window shade is provided. The material has a proximal end attached to the roller tube and a movable distal end. The window shade includes a rotational position sensor and is controlled by a computing device. The method comprises the steps of: (1) rotating the roller tube to position the distal end at an initial position; (2) rotating the roller tube to move the distal end from the initial position to a first position; (3) sensing a first change in rotational position associated with the roller tube rotation required to move the distal end from the initial position to the first position; (4) calculating a first number of revolutions of the roller tube using the first change in rotational position; (5) measuring a first distance between the initial position and the first position; (6) rotating the roller tube to move the distal end to a second position required to move the distal end between the initial position and the second position; (7) sensing a second change in rotational position associated with the roller tube rotation; (8) calculating a second number of revolutions of the roller tube using the second change in rotational position; (9) measuring the second distance between the initial position and the second position; and (10) calculating the radius and the thickness using the first distance, the first number of revolutions, the second distance, and the second number of revolutions.

According to a second embodiment of the present invention, a method of determining the radius of a roller having a flexible material wound thereon and the thickness of the material, comprises the steps of (1) unwinding the material to an initial position; (2) rotating the roller so as to move the material from the initial position to first and second positions and determining the distances the material has moved from the initial position to the first and second positions and the corresponding numbers of roller revolutions during the material movements; and (3) using a formula relating the distances to a function of the corresponding numbers of roller revolutions, the roller radius and material thickness to solve for the roller radius and the material thickness, where the solved for roller radius includes the combined thickness of any material wound on the roller at the initial position.

In addition, the present invention provides a method for calculating a tube radius of a roller tube and fabric thickness of a shade fabric rotatably supported by the roller tube. The method comprising the steps of: (1) moving a lower edge of the shade fabric to a first position at a first linear distance from a predetermined position; (2) determining a first number of revolutions of the roller tube between the first position and the predetermined position; (3) moving the lower edge of the shade fabric to a second position at a second linear distance from the predetermined position; (4) determining a second number of revolutions of the roller tube between the second position and the predetermined position; and (5) calculating the tube radius and the fabric thickness from the first and second linear distances and the first and second numbers of revolutions.

According to another aspect of the present invention, a method of determining an effective fabric size of a shade fabric rotatably supported by a roller tube utilizing a radius of the roller tube and a thickness of the shade fabric comprises the steps of determining a total number of revolutions of the roller tube between a fully closed position and a fully open position of the shade fabric, and calculating the effective fabric size from the radius of the roller tube, the thickness of the shade fabric, and the total number of revolutions.

The present invention further provides a method of fading a hembar of a shade fabric from a first position to a second position across a predetermined period of time. The shade fabric has a thickness and is rotatably supported by a roller tube, and the roller tube has a radius. The method comprising the steps of determining a desired constant linear speed of the hembar from the predetermined period of time and a first linear distance between the first position and the second position, and rotating the roller tube to move the hembar from the first position to the second position at the constant linear speed across the predetermined period of time.

Other features and advantages of the present invention will become apparent from the following description of the invention that refers to the accompanying drawings.

DETAILED DESCRIPTION OF THE INVENTION

Figure 1:
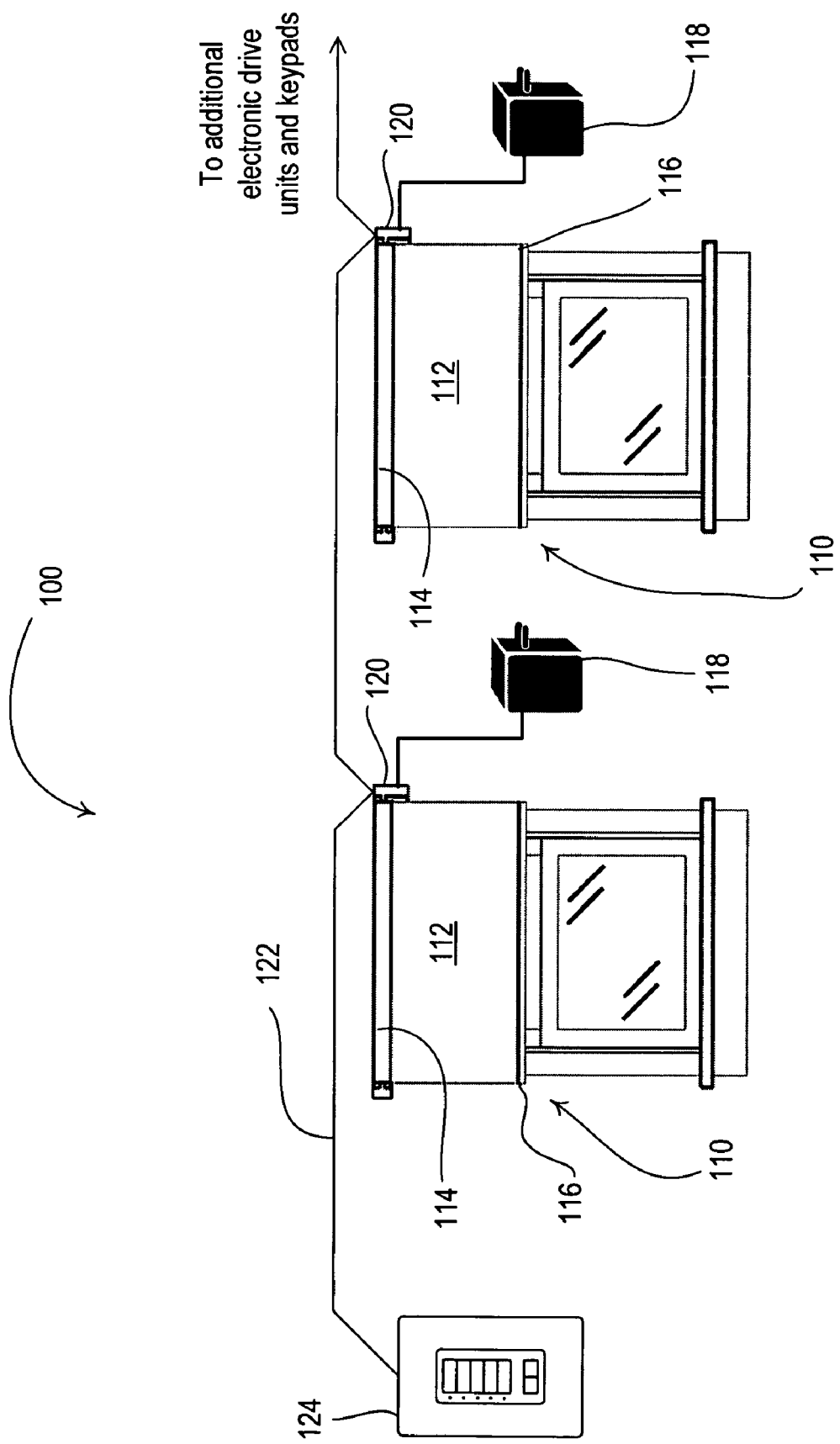
FIG. 1 is a simplified block diagram of a control system for a plurality of motorized window treatments according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a control system 100 for a plurality of motorized window shades 110 according to the present invention. Each motorized window shade 110 comprises a flexible material, e.g., a flexible shade fabric 112, rotatably supported by a roller tube 114 and having a hembar 116 at the lower edge of the fabric. The motorized window treatments 110 are controlled by electronic drive units (EDUs) 120 which are powered through transformers 118. The electronic drive units 120 are operable to control the shade fabrics 112 between an open position and a closed position. The motorized window shades 110 are coupled to a communication bus 122 and are operable to receive commands from a keypad 124 across the communication bus. The control system 100 is described in greater detail in commonly-assigned U.S. Pat. No. 6,983,783, issued Jan. 10, 2006, entitled MOTORIZED CONTROL SYSTEM, the entire disclosure of which is hereby incorporated by reference.

Figure 2:
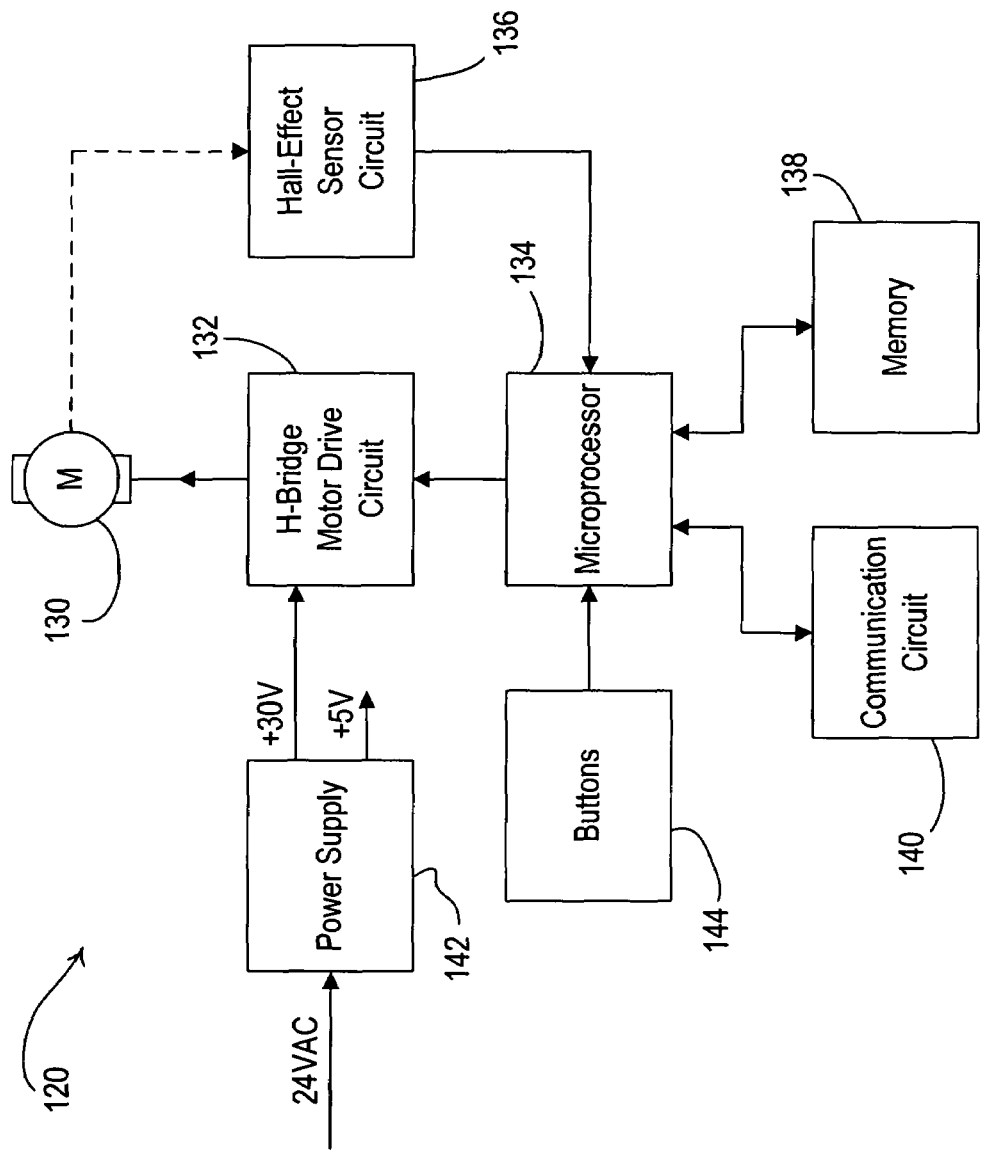
FIG. 2 is a simplified block diagram of an electronic drive unit for one of the motorized window treatments of FIG. 1 according to the present invention.

FIG. 2 is a simplified block diagram of the electronic drive unit 120 of the motorized window shade 110 according to the present invention. A direct-current (DC) motor 130 is coupled to the roller tube 114 and is operable to controllably rotate the roller tube at a constant speed when a constant DC voltage is applied to the motor. Changing the DC voltage applied to the DC motor 130 will change the rotational speed of the motor. Further, the DC motor 130 is operable to change the direction of rotation in response to a change in the polarity of the DC voltage applied to the DC motor.

To accomplish this level of control of the DC motor 130, the motor is coupled to an H-bridge motor drive circuit 132, which is driven by a microcontroller 134. The H-bridge motor drive circuit 132 comprises four transistors, such as, for example, four field effect transistors (not shown). The transistors are coupled such that, when two of the transistors are conductive, a positive DC voltage is applied to the DC motor 130 to cause the DC motor to rotate in a forward direction. When the other two transistors of the H-bridge circuit 132 are conductive, a negative DC voltage is applied to the DC motor 130 to cause the motor to rotate in the reverse direction. To control the speed of the DC motor 130, the microcontroller 134 preferably drives the H-bridge circuit 132 with a pulse width-modulated (PWM) signal. The microcontroller 134 may be any suitable controller, such as a programmable logic device (PLD), a microprocessor, or an application specific integrated circuit (ASIC).

Figure 3:
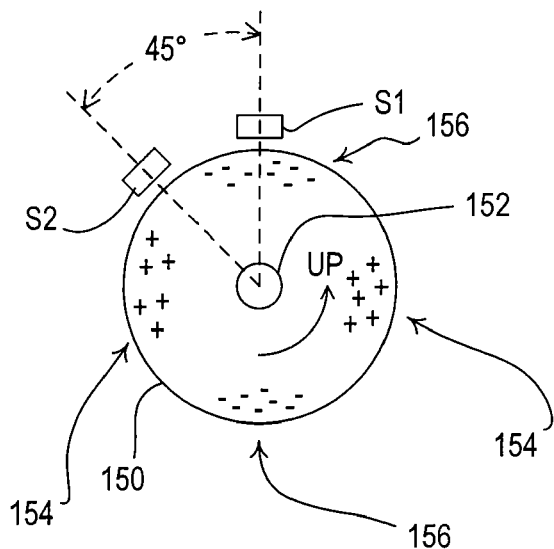
FIG. 3 is a partial schematic end view showing the physical assembly of a Hall effect sensor circuit of the electronic drive unit of FIG. 2.

The electronic drive unit 120 includes a Hall effect sensor circuit 136, which is a rotational position sensor that is operable to provide information regarding the rotational speed and the direction of the DC motor 130 to the microcontroller 134. FIG. 3 is a partial schematic end view of the electronic drive unit 120 showing the physical assembly of the Hall effect sensor circuit 136. The Hall effect sensor circuit 136 comprises two Hall effect sensors S1, S2. The sensors S1, S2 are located in close proximity with a sensor magnet 150, which is secured to an output shaft 152 of the motor 130. The sensors S1, S2 are located adjacent the periphery of the magnet 150 and separated from each other by 45°. The sensor magnet 150 includes two positive poles 154 (i.e., "north" poles) and two negative poles 156 (i.e., "south" poles). Alternatively, the sensor magnet 150 may only include one positive pole and one negative pole.

Figure 4:
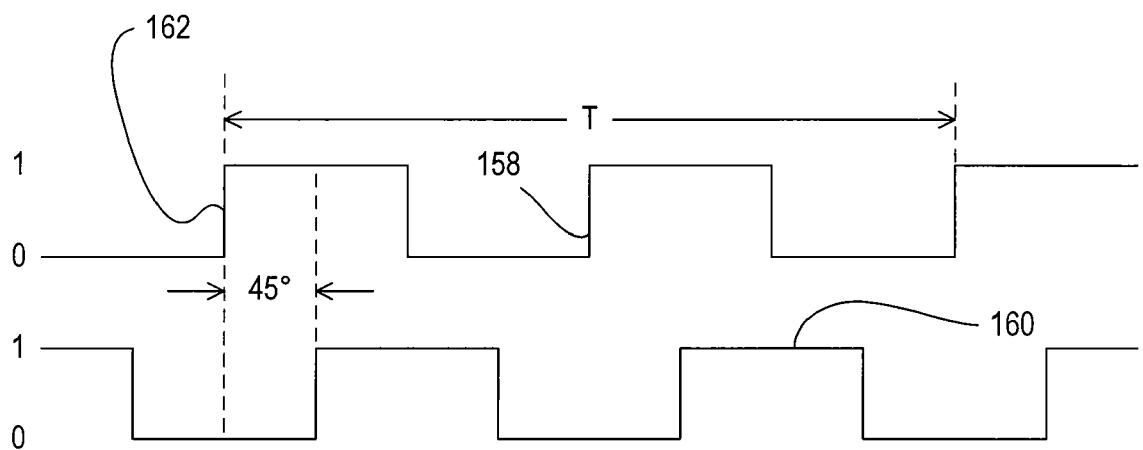
FIG. 4 is a diagram of output signals of the Hall effect sensor circuit of FIG. 3.

FIG. 4 is a diagram of a first output signal 158 and a second output signal 160 of the sensors S1, S2, respectively. The sensors S1, S2 provide the output signals 158, 160 to the microcontroller 134 as a train of pulses in dependence upon whether each of the sensors are close to one of the positive poles 154 or one of the negative poles 156. For example, when the sensor magnet 150 rotates such that one of the north poles 154 moves near the first sensor S1 (rather than one of the adjacent negative poles 156), the first output signal 158 will transition from low (i.e., a logic zero) to high (i.e., a logic one) as shown by the edge 162 in FIG. 4. When the sensor magnet 150 has two positive poles and two negative poles, the output signals 158, 160 have two rising edges and two falling edges per revolution of the output shaft 152.

The frequency, and thus the period T, of the pulses of the output signals 158, 160 is a function of the rotational speed of the motor output shaft 152. The relative spacing between the pulses of the first and second output signals 158, 160 is a function of rotational direction. When the motor 130 is rotating in an upwards direction (i.e., corresponding to the counterclockwise direction of the motor output shaft 152 marked "UP" in FIG. 7), the second output signal 160 will lag behind the first output signal 158 by approximately 45° or ⅛ of the period T. When the motor 130 is rotating in the opposite direction, the second output signal 160 will lead the first output signal 158 by approximately 45°. The operation of the H-bridge motor drive circuit 132 and the Hall effect sensor circuit 136 of the electronic drive unit 120 is described in greater detail in commonly-assigned U.S. Pat. No. 5,848,634, issued Dec. 15, 1998, entitled MOTORIZED WINDOW SHADE SYSTEM, the entire disclosure of which is herein incorporated by reference.

Referring back to FIG. 2, a memory 138 is coupled to the microcontroller 134. The memory 138 is operable to store the present position of the hembar 116 of the shade fabric 112, i.e., a number H of Hall effect sensors edges between the present position of the shade fabric and the closed position. A Hall effect sensor edge is, for example, a low-to-high transition of the first output signal 158 as shown in FIG. 4. The memory 138 is further operable to store the fully open position and the fully closed position in terms of Hall effect sensor edges. During the setup and configuration of the electronic drive unit 120, the open position and the closed position are set and stored in the memory 138.

The electronic drive unit 120 further comprises a communication circuit 140 that allows the microcontroller 134 to transmit and receive communication signals to and from the keypad 124 and other electronic drive units 120. A power supply 142 receives a $24V_{AC}$ signal from the transformer 118 and generates a $30V_{DC}$ voltage for powering the H-bridge motor drive circuit 132, and thus the motor 130, and a $5V_{DC}$ voltage for powering the other components (i.e., the microcontroller 134, the memory 138, and the communication circuit 140). The electronic drive unit 120 further comprises a plurality of buttons 144 that allow a user to provide inputs to the microcontroller 134 during setup and configuration of the motorized window shade 110.

Figure 5:
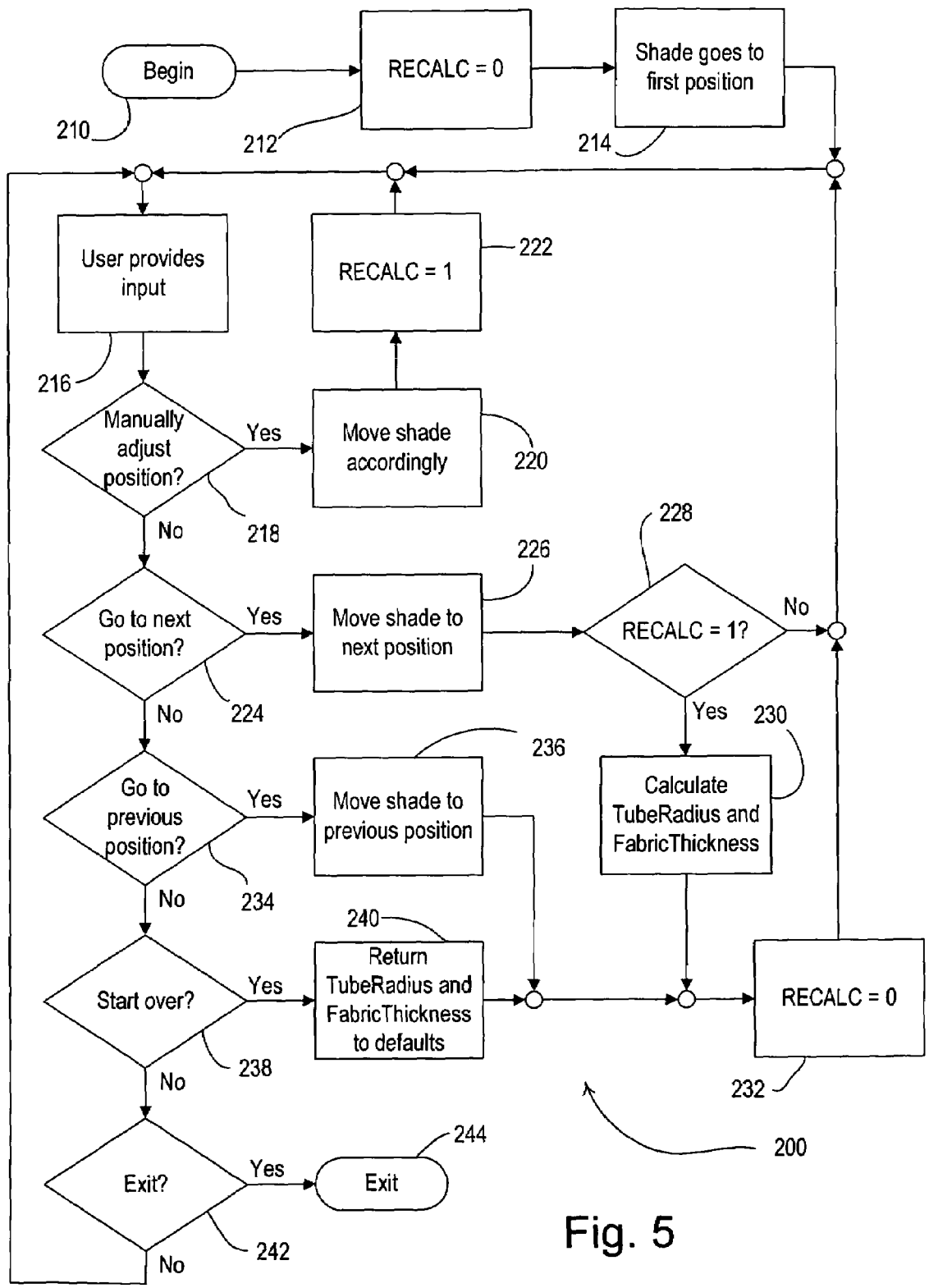
FIG. 5 is a flowchart of a calibration procedure for one of the motorized window treatments of FIG. 1 according to the present invention.

FIG. 5 is a flowchart of a calibration procedure 200 for the motorized window shade 110 according to the present invention. The calibration procedure 200 allows the microcontroller 134 to determine the effective thickness of the shade fabric 112 installed on the roller tube 114 and the effective radius of the roller tube, i.e., the radius of the roller tube plus any fabric wound around the tube when the shade fabric is in the closed position. Where used herein, the terms "tube radius" and "effective tube radius" refer to the radius of the roller tube 114 plus any fabric 112 wound around the tube when the shade fabric is in the closed position.

Since the shade fabric 112 wraps around the roller tube 114 as the roller shade rotates, a distance d between the present position of the shade fabric and the closed position is a function of the tube radius r and the fabric thickness t. Accordingly, the circumference of the roller tube plus the wrapped fabric is different for each revolution of the roller tube 114. For example, when the shade is in the closed position, the circumference $c_1$ of the roller tube is simply $$c_1 = 2\pi r.$$

Thus, during the first revolution of the roller shade, the amount of fabric wound around the roller tube will be equal to the circumference $c_1$. During the second revolution of the roller shade, the circumference $c_2$ of the roller tube is $$c_2 = 2\pi(r+t),$$

and the amount of fabric wound around the roller tube will be equal to the second circumference $c_2$. During the next m revolutions, the circumference $c_m$ for each revolution is $$c_m = 2\pi \cdot [r + (m-1) \cdot t].$$

The last revolution of the roller shade will only be a partial rotation of the roller tube. If the total revolutions between the present position and the closed position is a number M, the amount of shade fabric wound around the tube during the last revolution is $$c_{PARTIAL} = 2\pi \cdot [r + \text{int}(M) \cdot t] \cdot \text{frac}(M),$$

where int(M) is the integer part of the number M and frac(M) is the fractional or non-integer part of the number M, i.e., $$\text{frac}(M) = [M - \text{int}(M)].$$

Accordingly, the distance d between the present position and the closed position is $$d = c_1 + c_2 + \ldots + c_m + c_{PARTIAL} \quad \text{(Equation 1)}$$

$$= \left( \sum_{m=1}^{\text{int}(M)} 2\pi \cdot [r + (m-1) \cdot t] \right) + 2\pi \cdot$$

$$[r + \text{int}(M) \cdot t] \cdot \text{frac}(M).$$

This equation simplifies to $$d = 2\pi \cdot [(a \cdot r) + (b \cdot t)], \quad \text{(Equation 2)}$$

where $$a = M,$$

$$b = \text{int}(a) \cdot \left( \frac{\text{int}(a) - 1}{2} \right) + \text{frac}(a).$$

The goal of the calibration procedure 200 is to determine the effective tube radius r and the effective fabric thickness t of the roller tube 114. Preferably, the microcontroller 134 utilizes Equation 2 as noted above to solve for the tube radius r and the fabric thickness t by forming two equations (i.e., two of Equation 2) having two unknowns (r and t). Therefore, the microcontroller 134 needs to determined the distance d and the number M of revolutions at two separate data points, i.e., two separate positions of the shade fabric 112. As used herein, a "data point" is defined as the set of data consisting of the distance d between the present position of the hembar 116 of the shade fabric 112 and the closed position and the number M of revolutions of the shade tube 114 between the present position and the closed position. The calibration procedure 200 allows the microcontroller 134 to collect these values at two data points. Accordingly, two equations having two unknowns (the tube radius r and the shade thickness t) result from two data points, e.g., $$d_1 = 2\pi \cdot [(a_1 \cdot r) + (b_1 \cdot t)]; \quad \text{(Equation 3)}$$

$$d_2 = 2\pi \cdot [(a_2 \cdot r) + (b_2 \cdot t)]. \quad \text{(Equation 4)}$$

The microcontroller 134 is operable to solve for the tube radius r and the shade thickness t from these two equations.

The number M of total revolutions between any two of the predetermined shade positions is determined from the number H of Hall effect sensor edges between these two positions. The electronic drive unit 120 is characterized by a constant number K of Hall effect sensor edges per revolution of the roller tube, for example, 170 Hall effect sensor edges per revolution, such that the number M of revolutions between two shade positions is $$M = H/K. \quad \text{(Equation 5)}$$

Specifically, the calibration procedure 200 allows a user to manually adjust the shade fabric 112 to a number of predetermined shade positions (e.g., one foot above, two feet above, and three feet above the closed position) and to confirm the shade position by using a measuring tool, such as a measuring tape. The distance d from Equation 2 is determined from the predetermined shade positions, e.g., one foot above the closed position. During the calibration procedure 200, the microcontroller 134 utilizes a RECALC flag to recalculate the values of the tube radius r and the fabric thickness t. If the RECALC flag is set, i.e., is a logic one, the microcontroller 134 is operable to recalculate the values of the tube radius r and the fabric thickness t. On the other hand, if the RECALC flag is cleared, i.e., is a logic zero, the microcontroller 134 will not modify the present values of the fabric thickness and the tube radius.

Referring now to FIG. 5, the calibration procedure 200 begins at step 210, for example, when a user presses and holds a predetermined actuator, such as, for example, one of the plurality of buttons 144 on the electronic drive unit 120, for a predetermined amount of time. The RECALC flag is cleared, i.e., set to logic zero at step 212, and the shade fabric is sent to a first position, e.g., preferably one foot above the closed position, at step 214. At step 216, the user provides an input by either (1) manually adjusting the shade fabric position, (2) electing to go to the next position, (3) electing to go to the previous position, (4) electing to start over, or (5) electing to exit.

When the shade fabric 112 is at the first position, the user can manually adjust the position of the shade fabric 112, for example, by actuating a raise button or a lower button of the plurality of buttons 144 on the electronic drive unit 120. Further, the user uses a measuring tool to ensure that the hembar 116 of the motorized window shade 110 is substantially one foot above the closed position. Specifically, if the user manually adjusts the position of the shade fabric at step 218, the microcontroller 134 will move the shade fabric 112 to the appropriate position at step 220 and the RECALC flag will be set, i.e., equal to logic one, at step 222. The process loops back around to allow the user to provide another input at step 216, and thus to continually modify the position of the shade fabric 114. When the shade fabric 112 is as close as possible to the desired position, i.e., one foot above the closed position, the user can actuate a button, e.g., an open position actuator, on the electronic drive unit 120 at step 224. The electronic drive unit 120 will move the shade fabric 112 to the next location, e.g., two feet above the closed position, at step 226. If, at step 228, the RECALC flag is a logic one, the microcontroller 134 will recalculate the tube radius r and the fabric thickness t at step 230 (as will be described below in greater detail with reference to FIG. 6). After the RECALC flag is cleared, i.e., set to a logic zero, at step 232, or if the RECALC flag is not a logic one at step 228, the process loops around to allow the user to provide an input at step 216. At this time, the user may manually adjust the position of the shade fabric at step 218 to ensure that the hembar 116 is substantially two feet above the closed position. Accordingly, the calibration procedure 200 can continue to loop allowing the user to manually adjust the position of the shade fabric at a plurality of predetermined shade positions, for example, at increments of one foot.

If the user does not manually adjust the position of the shade fabric at step 218 or choose to go to the next position at step 224, the user may elect to go to the previous position at step 234 by actuating a button, e.g., a closed position actuator, on the electronic drive unit 120. For example, if the hembar of the shade fabric is two feet above the closed position and the user elects to go to the previous position at step 234, the microcontroller 134 will move the shade fabric such that the hembar is substantially one foot above the closed position at step 236. Next, the RECALC flag is cleared at step 232 and the process loops around to allow the user to provide another input at step 216. Alternatively, the user may elect to start over at step 238, for example, by pressing and holding the closed position actuator on the electronic drive unit 120. If so, the shade fabric is moved to the first position and the values of the tube radius r and the fabric thickness t are reset to default values. Further, if the user elects to exit at step 240, for example, by pressing and holding the open position actuator on the electronic drive unit 120, the process exits at step 242.

Figure 6:
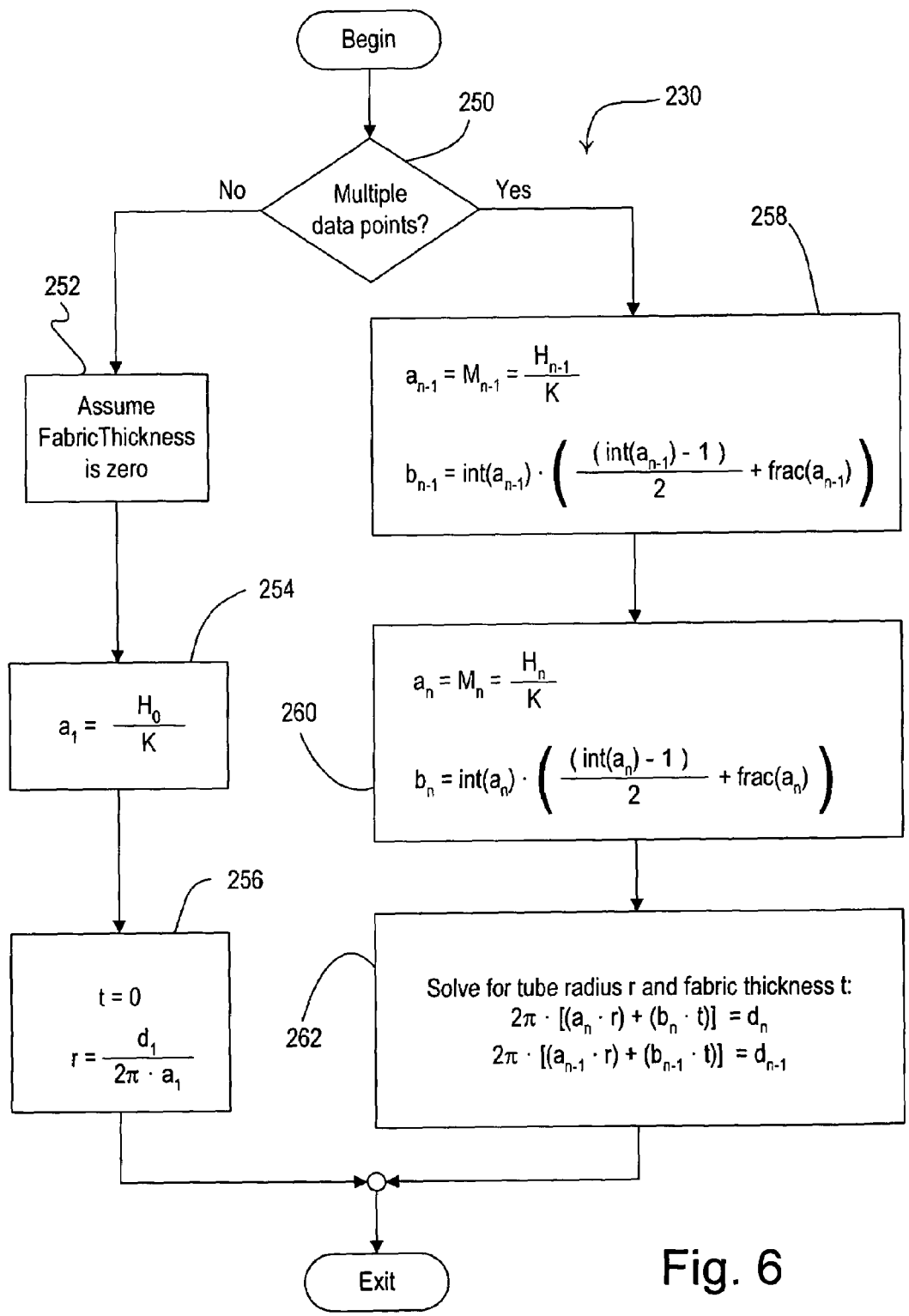
FIG. 6 is a flowchart of a method of calculating the tube radius and the fabric thickness utilized in the calibration procedure of FIG. 5.

FIG. 6 is a flowchart of the calculation procedure of step 230 for calculating the tube radius r and the fabric thickness t. At step 250, a determination is made if there are multiple data points, i.e., if the user has adjusted the position of the shade fabric at more than one predetermined shade position. If the user has only adjusted the shade fabric when the motorized window shade is at the first position, the microcontroller 134 will assume that the fabric thickness t is zero inches at step 252 in order to solve Equations 3 and 4 above. Accordingly, at step 254, the value $a_1$, i.e., the number or revolutions between the closed position and the first position, is calculated as $$a_1 = H_1/K. \qquad \text{(Equation 6)}$$

Next, at step 256, the fabric thickness t is set equal to zero and the tube radius r is calculated as $$r = d_1/(2\pi \cdot a_1), \qquad \text{(Equation 7)}$$

where $d_1$ is, for example, one foot.

Alternatively, if there are multiple data points, i.e., the user has adjusted the position of the shade fabric at two or more positions, the microcontroller 134 solves Equations 3 and 4 by utilizing two distances $d_n$, $d_{n-1}$ and two numbers $M_n$, $M_{n-1}$ of revolutions from two of the predetermined shade positions. For example, if the user just finished adjusting the shade position to a second position substantially two feet above the closed position, the microcontroller 134 will use the distance $d_1$ (i.e., one foot) and the distance $d_2$ (i.e., two feet) in addition to the number $H_1$ of Hall effect sensor edges between the closed position and the first position and the number $H_2$ of Hall effect sensor edges between the closed position and the second position. Accordingly, at step 258, the microcontroller 134 calculates the values $a_{n-1}$ and $b_{n-1}$ (i.e., $a_1$ and $b_1$) by using the number $H_1$ of Hall effect sensor edges between the closed position and the first position. Further, at step 260, the microcontroller 134 calculates the values $a_n$ and $b_n$ (i.e., $a_2$ and $b_2$) by using the number $H_2$ of Hall effect sensor edges between the closed position and the second position. Finally, the microcontroller 134 solves for the tube radius r and the fabric thickness t at step 262 by solving the two equations having two unknowns.

Using Equations 3 and 4, the microcontroller 134 requires only two data points in order to solve for the tube radius r and the fabric thickness t. The microcontroller 134 can simply use the first two data points, i.e., at one foot from the closed position and at two feet from the closed position. However, the accuracy of the values of the tube radius r and the fabric thickness t increase as the distance between the data point and the closed position increases. Accordingly, the user may adjust the shade position at multiple data points, e.g., four data points. Preferably, the data points are equally spaced apart and the microcontroller 134 uses the last data point and the data point at or closest to the midpoint of the data points to solve the equations. For example, if there are four data points, the microcontroller 134 uses the data point from the last distance $d_4$ and the data point from the midpoint distance $d_2$.

Once the microcontroller 134 has calculated the tube radius r and the fabric thickness t, the microcontroller is operable to compute the total effective shade fabric length, i.e., the linear distance between the open position and the closed position of the shade fabric. Since the open position and the closed position are stored in the memory 138, the microcontroller 134 is able to easily determine the total number $H_{TOTAL}$ of Hall effect sensor edges between the open position and the closed position, i.e., $$H_{TOTAL} = H_{OPEN} - H_{CLOSED},$$

where $H_{OPEN}$ is the number of Hall effect sensor edges corresponding to the open position and $H_{CLOSED}$ is the number of Hall effect sensor edges corresponding to the closed position. Accordingly, the effective total shade fabric length $d_{TOTAL}$ is calculated using Equation 2 as shown above, i.e., $$d_{TOTAL} = 2\pi \cdot [(a \cdot r) + (b \cdot t)], \qquad \text{(Equation 8)}$$

where $a = H_{TOTAL}/K,$ $b = int(a) \cdot \left(\dfrac{int(a)-1}{2}\right) + frac(a).$ After the microcontroller 134 has calculated the total shade fabric length $d_{TOTAL}$, the microcontroller 134 is operable to "fade" the shade fabric between two positions, i.e., to drive the motor such that the hembar 116 of the shade fabric 112 moves from a first position to a second position over a constant linear speed $v_{LIN}$ over a predetermined period of time $T_{FADE}$. The microcontroller 134 is operable to determine the desired linear speed $v_{LIN}$ of the hembar from a distance between the first and second positions and the predetermine period of time $T_{FADE}$. For example, the shade fabric could move from the open position to the midpoint between the open position and the closed position over a time $T_{FADE}$ at a linear speed $v_{LIN}$ of $$v_{LIN} = [(\tfrac{1}{2}) \cdot d_{TOTAL}]/T_{FADE}. \qquad \text{(Equation 7)}$$

Figure 7:
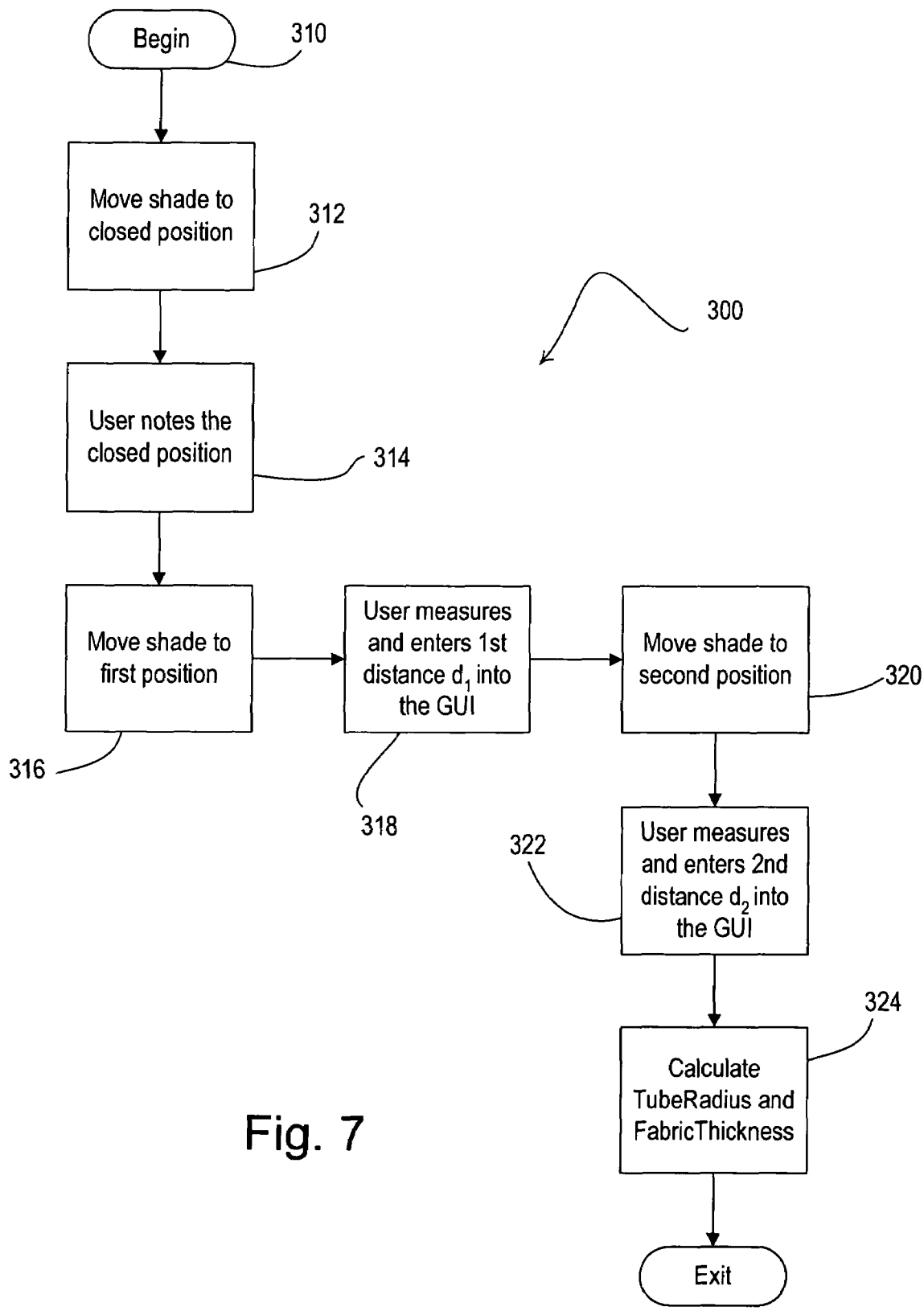
FIG. 7 is a flowchart of a calibration procedure for one of the motorized window treatments of FIG. 1 according to a second embodiment of the present invention.

FIG. 7 is a flowchart of a calibration procedure 300 for the motorized window shade 110 according to a second embodiment of the present invention. In order to execute the calibration procedure 200, the control system 100 includes a computing device, such as a personal computer (not shown), operable to communicate with the electronic drive units 120 of the motorized window shades 110. The personal computer includes a graphical user interface (GUI) for providing a simple set of steps for a user to complete in order to calibrate the motorized roller shade 110. The calibration procedure 300 begins at step 310 when the user enters a start command via the GUI. The shade is first moved to an initial position, e.g., preferably the fully closed position, at step 312, and the user notes at step 314 the position of the hembar 116 of the shade fabric 112. For example, the user notes that the hembar 116 is one inch above a windowsill when the shade fabric 112 is in the closed position. Next, the shade is moved to a first position, e.g., preferably the midpoint between the fully open position and the fully closed position, at step 316. At step 318, the user measures a distance $d_1$ between the initial position and the first position with a measuring tool, such as a measuring tape, and enters the measurement of the distance $d_1$ into the GUI of the computer. The computer is operable to communicate with the electronic drive unit 120 to determine a number $H_1$ of Hall effect sensor edges between the initial position and the first position. At step 320, the shade is moved to a second position, e.g., preferably, the fully open position, and at step 322, the user measure a distance $d_2$ between the second position and the initial position and enters the measurement of the distance $d_2$ into the GUI. Once again, the computer is operable to communicate with the electronic drive unit to determine a number $H_2$ of Hall effect sensor edges between the initial position and the second position. At step 324, the computer uses the two recorded data points to solve Equations 3 and 4 to determine the tube radius r and the fabric thickness t (as in steps 258, 260, 262 of FIG. 6).

Figure 8:
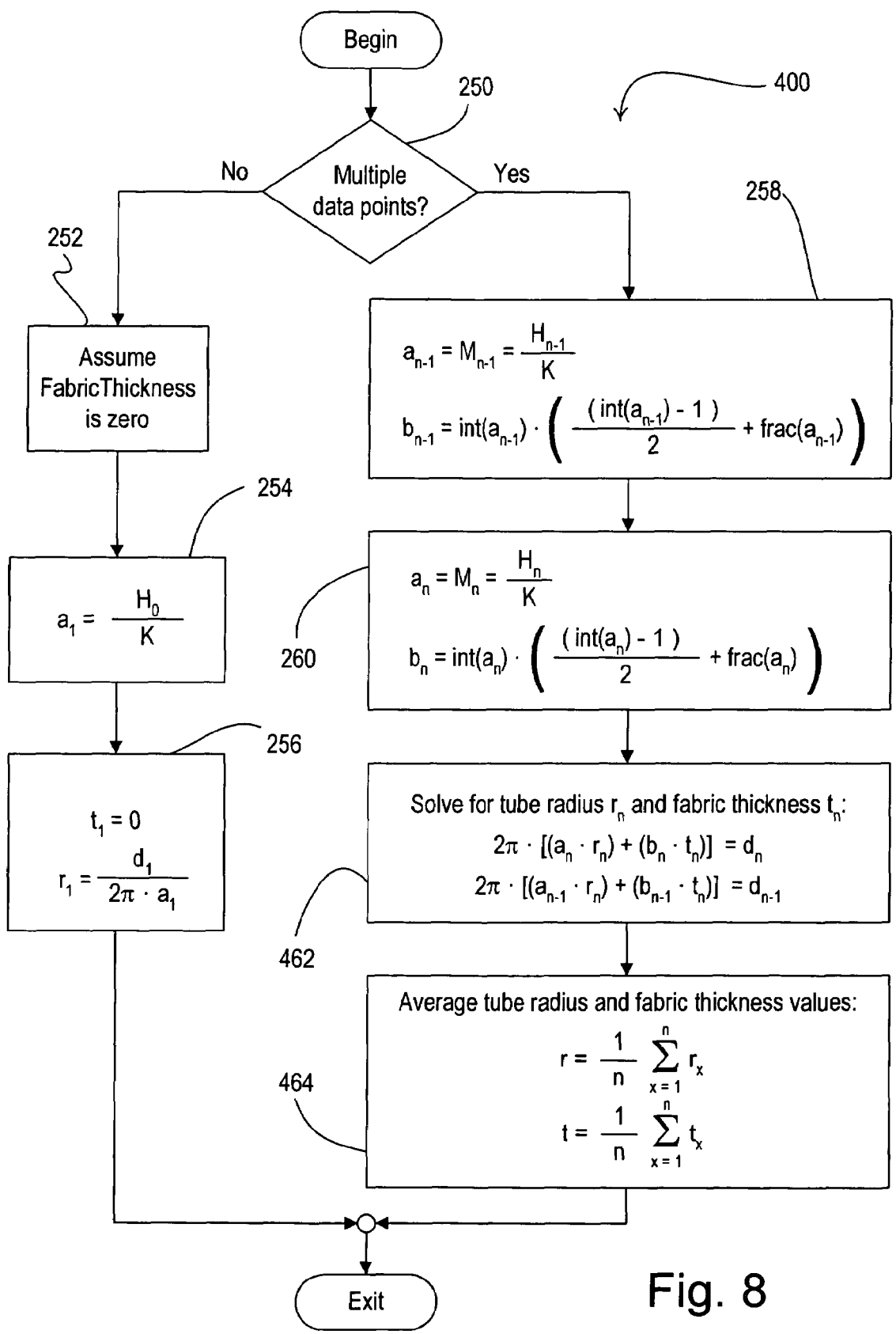
FIG. 8 is a flowchart of a method of calculating the tube radius and the fabric thickness according to a third embodiment of the present invention.

FIG. 8 is a flowchart of a method 400 of calculating the tube radius r and the fabric thickness t according to a third embodiment of the present invention. Preferably, the method 400 is used in place of step 230 of the calibration procedure 200 of FIG. 5. The calculation procedure 400 is very similar to the calculation procedure shown in FIG. 6. However, the calculation procedure 400 averages the values computed at each of the data points to determine the tube radius r and the fabric thickness t.

Specifically, at step 462, the microcontroller 134 solves Equations 3 and 4 using two data points to determine a tube radius $r_n$ and a tube thickness $t_n$. Accordingly, the tube radius $r_n$ and the tube thickness $t_n$ are calculated at multiple data points, such as, for example, four data points, where a fourth tube radius $r_4$ and a fourth tube thickness $t_4$ are determined from the fourth data point. At step 646, the microcontroller 134 averages all of the values of the tube radius $r_n$ and the tube thickness $t_n$ to determine the resultant tube radius r and the resultant fabric thickness t, i.e., $$r = (1/n)\sum_{x=1}^{n} r_x; \quad \text{(Equation 8)}$$

$$t = (1/n)\sum_{x=1}^{n} t_x. \quad \text{(Equation 9)}$$

Therefore, the final values of the tube radius r and the fabric thickness t derive from all of the data points.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The electronic drive unit 120 includes a Hall effect sensor circuit 136, which is a rotational position sensor that is operable to provide information regarding the rotational speed and the direction of the DC motor 130 to the microcontroller 134. FIG. 3 is a partial schematic end view of the electronic drive unit 120 showing the physical assembly of the Hall effect sensor circuit 136. The Hall effect sensor circuit 136 comprises two Hall effect sensors S1, S2. The sensors S1, S2 are located in close proximity with a sensor magnet 150, which is secured to an output shaft 152 of the motor 130. The sensors S1, S2 are located adjacent the periphery of the magnet 150 and separated from each other by 45°. The sensor magnet 150 includes two positive poles 154 (i.e., "north" poles) and two negative poles 156 (i.e., "south" poles). Alternatively, the sensor magnet 150 may only include one positive pole and one negative pole.

The frequency, and thus the period T, of the pulses of the output signals 158, 160 is a function of the rotational speed of the motor output shaft 152. The relative spacing between the pulses of the first and second output signals 158, 160 is a function of rotational direction. When the motor 130 is rotating in an upwards direction (i.e., corresponding to the counterclockwise direction of the motor output shaft 152 marked "UP" in FIG. 7), the second output signal 160 will lag behind the first output signal 158 by approximately 45° or ⅛ of the period T. When the motor 130 is rotating in the opposite direction, the second output signal 160 will lead the first output signal 158 by approximately 45°. The operation of the H-bridge motor drive circuit 132 and the Hall effect sensor circuit 136 of the electronic drive unit 120 is described in greater detail in commonly-assigned U.S. Pat. No. 5,848,634, issued Dec. 15, 1998, entitled MOTORIZED WINDOW SHADE SYSTEM, the entire disclosure of which is herein incorporated by reference.

What is claimed is:

1. A method of determining with an electronic drive unit a radius of a cylindrical roller tube driven by an electric motor controlled by the electronic drive unit and a thickness of a material wound around the roller tube, the material having a proximal end attached to the roller tube and a distal end movable in a plane, the method comprising the steps of:
   determining a first distance from an initial position of the distal end to a first position of the distal end;
   determining a second distance from the initial position of the distal end to a second position of the distal end;
   determining with the electronic drive unit a first number of revolutions of the roller tube required for moving the distal end from the initial position to the first position;
   determining with the electronic drive unit a second number of revolutions of the roller tube required for moving the distal end from the initial position to the second position; and
   determining with the electronic drive unit the radius and the thickness using the first distance, the first number of revolutions, the second distance, and the second number of revolutions.

2. The method of claim 1, wherein the radius and thickness are determined by calculating their values according to the equations:

$$d_1 = 2\pi \cdot [(a_1 \cdot r) + (b_1 \cdot t)]; \text{ and}$$

$$d_2 = 2\pi \cdot [(a_2 \cdot r) + (b_2 \cdot t)];$$

wherein
   r = the radius of the roller tube;
   t = the thickness of the material;
   $d_1$ = the first distance;
   $d_2$ = the second distance;
   $a_1$ = the first number of revolutions;
   $a_2$ = the second number of revolutions;

$$b_1 = int(a_1) \cdot \left(\frac{int(a_1) - 1}{2}\right) + frac(a_1);$$

$$b_2 = int(a_2) \cdot \left(\frac{int(a_2) - 1}{2}\right) + frac(a_2);$$

$int(a_1)$ is the integer part of $a_1$;
   $int(a_2)$ is the integer part of $a_2$;
   $frac(a_1)$ is the non-integer part of $a_1$; and
   $frac(a_2)$ is the non-integer part of $a_2$.

3. The method of claim 1, wherein the initial position corresponds to a closed position of the distal end corresponding to the material closing off a window opening.

4. The method of claim 1, wherein the step of determining the first number of revolutions comprises the steps of:
   rotating the roller tube so as to cause the distal end to move from the initial position to the first position; and
   sensing the number of revolutions the roller tube rotates as the distal end moves from the initial position to the first position.

5. The method of claim 4, wherein the step of rotating the roller tube comprises controllably rotating the roller tube in response to motor drive commands from a computing device of the electronic drive unit having a user interface for accepting material movement commands from a user.

6. The method of claim 1, wherein the step of determining the first distance comprises the steps of:
positioning the distal end at the initial position;
rotating the roller tube to move the distal end from the initial position to the first position; and
measuring the distance traveled by the distal end.

7. The method of claim 1, wherein the step of determining the first distance comprises the steps of:
positioning the distal end at the initial position; and
rotating the roller tube to move the distal end from the initial position to the first position;
wherein the distance from the initial position to the first position is known.

8. A method of determining, with an electronic drive unit a radius of a roller tube driven by an electric motor controlled by the electronic drive unit and a thickness of a material wound around the roller tube, of at least one motorized circular cylinder window shade, the material having a proximal end attached to the roller tube and a movable distal end, the window shade including a rotational position sensor and controlled by a computing device of the electronic drive unit, the method comprising the steps of:
rotating the roller tube to position the distal end at an initial position;
rotating the roller tube to move the distal end from the initial position to a first position;
sensing with a sensor coupled to the electronic drive unit a first change in a rotational position associated with the roller tube rotation required to move the distal end from the initial position to the first position;
calculating using the computing device a first number of revolutions of the roller tube using the first change in the rotational position;
measuring a first distance between the initial position and the first position;
rotating the roller tube to move the distal end to a second position;
sensing with the sensor a second change in the rotational position associated with the roller tube rotation required to move the distal end between the initial position and the second position;
calculating using the computing device a second number of revolutions of the roller tube using the second change in the rotational position;
measuring the second distance between the initial position and the second position; and
calculating using the computing device the radius and the thickness using the first distance, the first number of revolutions, the second distance, and the second number of revolutions.

9. The method of claim 8, wherein the step of calculating the radius and the thickness comprises solving the equations:

$$d_1 = 2\pi \cdot [(a_1 \cdot r) + (b_1 \cdot t)];\text{ and}$$

$$d_2 = 2\pi \cdot [(a_2 \cdot r) + (b_2 \cdot t)];$$

wherein
r=the radius of the roller tube;
t=the thickness of the material;
$d_1$=the first distance;
$d_2$=the second distance;
$a_1$=the first number of revolutions;
$a_2$=the second number of revolutions;

$$b_1 = int(a_1) \cdot \left(\frac{int(a_1) - 1}{2}\right) + frac(a_1);$$

$$b_2 = int(a_2) \cdot \left(\frac{int(a_2) - 1}{2}\right) + frac(a_2);$$

$int(a_1)$ is the integer part of $a_1$;
$int(a_2)$ is the integer part of $a_2$;
$frac(a_1)$ is the non-integer part of $a_1$; and
$frac(a_2)$ is the non-integer part of $a_2$.

10. A method of determining, with an electronic drive unit the radius of a roller driven by an electric motor controlled by the electronic drive unit having a flexible material wound thereon and the thickness of the material, the roller for winding and unwinding the material, the material being unwound into a planar form, the method comprising the steps of:
moving the material to an initial position;
rotating the roller with the motor controlled by the electronic drive unit so as to move the material from the initial position to first and second positions;
determining, using a computing device of the electronic drive unit, first and second distances the material has moved from the initial position to the first and second positions, respectively, and corresponding first and second numbers of roller revolutions during the material movements; and
using a formula stored in the computing device of the electronic drive unit relating the first and second distances to a function of the corresponding first and second numbers of roller revolutions, the roller radius and material thickness to solve for the roller radius and the material thickness, where the solved for roller radius includes the combined thickness of any material wound on the roller at the initial position.

11. A method of calculating, with an electronic drive unit a tube radius of a roller tube driven by an electric motor controlled by the electronic drive unit and fabric thickness of a shade fabric rotatably supported by the roller tube, the method comprising the steps of:
moving a lower edge of the shade fabric to a first position at a first linear distance from a predetermined position;
determining using the electronic drive unit a first number of revolutions of the roller tube between the first position and the predetermined position;
moving the lower edge of the shade fabric to a second position at a second linear distance from the predetermined position;
determining using the electronic drive unit a second number of revolutions of the roller tube between the second position and the predetermined position; and
calculating using the electronic drive unit the tube radius and the fabric thickness from the first and second linear distances and the first and second numbers of revolutions.

12. The method of claim 11, wherein the steps of moving further comprise the steps of:
manually adjusting the lower edge of the shade fabric;
measuring the linear distance between the lower edge of the shade fabric and the predetermined position; and
repeating the steps of manually adjusting and measuring until the linear distance between the lower edge of the shade fabric and the predetermined position is substantially equal to one of the first linear distance and the second linear distance.

13. The method of claim 12, wherein the step of determining the first number of revolutions further comprises calculating the first number of revolutions from a first number of detected Hall effect sensor edges between the first position and the predetermined position, and the step of determining the second number of revolutions further comprises calculating the second number of revolutions from a second number of detected Hall effect sensor edges between the second position and the predetermined position.

14. The method of claim 13, wherein the predetermined position is substantially a fully closed position of the shade fabric; and
wherein the first linear distance is substantially one foot and the second linear distance is substantially two feet.

15. The method of claim 11, further comprising the steps of:
measuring the first linear distance between the first position and the predetermined position; and
measuring the second linear distance between the second position and the predetermined position.

16. The method of claim 15, further comprising the steps of:
controlling the position of the roller tube in response to a software program on a computer; and
providing the first and second linear distances as inputs to the software program on the computer.

17. The method of claim 16, wherein the predetermined position is substantially a fully closed position of the shade fabric; and
wherein the step of moving the lower edge of the shade fabric to the first position comprises moving the shade fabric to substantially a fully open position and the step of moving the lower edge of the shade fabric to the second position comprises moving the lower edge of the shade fabric to a midpoint position approximately 50% of the distance between the fully open position and the fully closed position.

18. The method of claim 11, further comprising the steps of:
determining using the electronic drive unit a total number of revolutions of the roller tube between a fully closed position and a fully open position of the shade fabric; and
calculating using the electronic drive unit an effective fabric size from the tube radius, the fabric thickness, and the total number of revolutions.

19. The method of claim 18, further comprising the step of:
moving the lower edge of the shade fabric from a third position to a fourth position at a constant linear speed across a predetermined period of time.

20. The method of claim 11, further comprising the steps of:
moving the lower edge of the shade fabric to a third position at a third linear distance from the predetermined position;
determining a third number of revolutions of the roller tube between the third position and the predetermined position;
calculating a first tube radius and a first fabric thickness from the first and second linear distances and the first and second numbers of revolutions;
calculating a second tube radius and a second fabric thickness from the third linear distance and one of the first and second linear distances, and the third number of revolutions and one of the first and second numbers of revolutions; and
calculating the tube radius and the fabric thickness from the first and second tube radii and the first and second fabric thicknesses.

21. A method of determining with an electronic drive unit an effective fabric size of a shade fabric rotatably supported by a roller tube driven by an electric motor controlled by the electronic drive unit, the roller tube having a radius, the shade fabric having a thickness, the method comprising the steps of:
determining using the electronic drive unit a total number of revolutions of the roller tube between a fully closed position and a fully open position of the shade fabric; and
calculating using the electronic drive unit the effective fabric size from the radius of the roller tube, the thickness of the shade fabric, and the total number of revolutions.

22. The method of claim 21, wherein the step of calculating further comprises solving the equation:

$$d = 2\pi \cdot [(M \cdot r) + (b \cdot t)];$$

wherein
d=the effective fabric size;
r=the radius of the roller tube;
t=the thickness of the shade fabric;
M=the total number of revolutions between the open position and the closed position;

$$b = int(M) \cdot \left(\frac{int(M) - 1}{2}\right) + frac(M);$$

int(M) is the integer part of M; and
frac(M) is the non-integer part of M.

23. The method of claim 21, wherein the step of determining a total number of revolutions comprises calculating the total number of revolutions from a number of Hall effect sensor edges detected between the open position and the closed position.

24. A method of fading a hembar of a shade fabric from a first position to a second position across a predetermined period of time using an electronic drive unit, the shade fabric having a thickness and rotatably supported by a roller tube driven by an electronic motor controlled by the electronic drive unit, the roller tube having a radius, the method comprising the steps of:
determining a desired constant linear speed of the hembar from the predetermined period of time and a first linear distance between the first position and the second position; and
rotating the roller tube using the electronic drive unit to move the hembar from the first position to the second position at the constant linear speed across the predetermined period of time,
further wherein the first position and the second position are expressed as a percentage of a total linear distance between a fully open position and a fully closed position of the shade fabric, the method further comprising the steps of:
determining using the electronic drive unit a total number of revolutions of the roller tube between the fully closed position and the fully open position of the shade fabric; and
calculating using the electronic drive unit the total linear distance between the fully open position and the fully closed position from the radius of the roller tube, the thickness of the shade fabric, and the total number of revolutions.

25. The method of claim 24, wherein the step of determining a desired constant linear speed comprises solving the equation:

$$V_{LIN} = d/T;$$

wherein $V_{LIN}$ is the desired constant linear speed;

d is the first linear distance between the first position and the second position; and T is the predetermined period of time.

26. An apparatus for determining a radius of a cylindrical roller tube and a thickness of a material wound around the roller tube, the material having a proximal end attached to the roller tube and a distal end movable in a plane, the apparatus comprising:

means for determining a first distance of the distal end from an initial position to a first position;

means for determining a second distance of the distal end from an initial position to a second position;

means for determining a first number of revolutions of the roller tube required for moving the distal end from the initial position to the first position;

means for determining a second number of revolutions of the roller tube required for moving the distal end from the initial position to the second position; and means for determining the radius and the thickness using the first distance, the first number of revolutions, the second distance, and the second number of revolutions.

27. An electronic drive unit for a motorized roller shade having a shade fabric rotatably supported by a roller tube, the shade fabric having a thickness, the roller tube having a radius, the electronic drive unit comprising:

a motor coupled to the roller tube for rotation of the roller tube;

a motor drive circuit coupled to the motor;

a controller coupled to the motor drive circuit operable to drive the motor drive circuit so as to control the speed of rotation of the motor and the direction of rotation of the motor, the controller operable to cause the motor to move a lower edge of the shade fabric to a first position at a first linear distance from an initial position and to move the lower edge of the shade fabric to a second position at a second linear distance from the initial position; and a rotational position sensor coupled to the motor and the controller for determining a first number of revolutions of the motor between the first position and the initial position and a second number of revolutions of the motor between the second position and the initial position;

wherein the controller is operable to calculate the radius of the roller tube and the thickness of the shade fabric from the first and second linear distances and the first and second numbers of revolutions.

* * * * *